United States Patent [19]

Marason, Jr. et al.

[11] 4,124,215
[45] Nov. 7, 1978

[54] INERTIAL PHONOGRAPH DEVICE

[75] Inventors: Gabriel Marason, Jr.; Harold B. Collins, both of Hawthorne, Calif.

[73] Assignee: Mattel, Inc., Hawthorne, Calif.

[21] Appl. No.: 761,379

[22] Filed: Jan. 21, 1977

[51] Int. Cl.² .............................................. G11B 3/00
[52] U.S. Cl. .................................... 274/1 A; 274/9 R
[58] Field of Search ............... 274/1 A, 1 C, 1 E, 1 R, 274/9 R, 39 A, 39 R, 7

[56] References Cited

U.S. PATENT DOCUMENTS

| 764,748 | 7/1904 | Moore | 274/9 R |
|---|---|---|---|
| 989,629 | 4/1911 | Miller | 274/1 C |
| 1,809,669 | 6/1931 | Borromeo | 274/9 R |
| 1,833,789 | 11/1931 | Mitchell | 274/1 R |
| 1,837,076 | 12/1931 | Shulman | 274/9 R |
| 2,004,431 | 6/1935 | Gerald | 192/42 |
| 3,282,590 | 11/1966 | Ashmele et al. | 274/1 A |

Primary Examiner—Richard E. Aegerter
Assistant Examiner—John W. Shepperd
Attorney, Agent, or Firm—John G. Mesaros; Max E. Shirk; Stephen L. King

[57] ABSTRACT

An inertial phonograph device having a flywheel carrying a record member having a plurality of interleaved sound tracks pre-recorded to match the rundown speed of the flywheel. A constant predetermined rotational force is imparted to the flywheel by means of a sector gear selectively engaging a pinion on the shaft of the flywheel, the sector gear being pivoted under the force of a spring. The sector gear is pivoted against the force of the spring out of engagement with the pinion by means of a cocking lever, and after engagement of the sector gear with the pinion rotation is restricted by a brake shoe coacting with the flywheel until the cocking lever is fully returned.

16 Claims, 21 Drawing Figures

FIG. 20

INERTIAL PHONOGRAPH DEVICE

BACKGROUND OF THE INVENTION

The background of the invention will be discussed in two parts:

1. Field of the Invention

This invention relates to phonograph devices and more particularly to a spring-powered inertial phonograph device or voice unit.

2. Description of the Prior Art

Mechanical phonograph devices, particularly smaller units have been used extensively in toy dolls or the like. Some of these phonograph devices, or voice units as they are referred to, employ records which are reproduced by means of a needle carried by a tone arm in mechanical contact with a speaker member. Ordinarily such voice units have had the record turntable speed controlled by a governor. Such units are powered by means of a drawstring which actuates a clock-type coil spring to provide the power for the unit. Such voice units are shown for example in U.S. Pat. No. 3,245,688 issued to Ryan on Apr. 12, 1966 and U.S. Pat. No. 3,532,346 issued to Barcus, et al., on Oct. 6, 1970. In both of these units the record is prerecorded to a constant speed and both are provided with appropriate means for governing the speed.

Accordingly it is an object of this invention to provide a new and improved phonograph device wherein the sound track is prerecorded to match the rundown speed of the flywheel on which the record is mounted.

It is another object of this invention to provide a new and improved actuating mechanism for a mechanical voice unit.

It is a further object of this invention to provide a new and improved compact phonograph device for use in toys or the like.

SUMMARY OF THE INVENTION

The foregoing and other objects of the invention are accomplished by providing a phonograph device having a record mounted on a flywheel with the sound tracks on the record prerecorded to match the rundown speed of the flywheel. Means are provided for suddenly imparting a predetermined rotational force to the flywheel, such means including a cocking lever coacting to pivot a gear sector against the force of a compression coil spring with the gear sector out of engagement with a pinion on the flywheel shaft. After full pivoting of the gear sector a portion thereof engages a projection within the housing to extend the gear sector into engagement with the pinion. Brake shoe means are provided for coacting with the flywheel and the cocking lever to maintain the flywheel stationary until the cocking lever is fully retracted whereupon the coil spring urging the sector gear to its original position, thereby suddenly imparting a predetermined rotational force to the flywheel. A tone arm having a needle depending therefrom coacts with a sound track pre-selected by means of a cam coacting with the tone arm to thereby reproduce the vibrations of the sound track through a speaker member. The speaker member is pivotally secured within the housing and means are provided responsive to actuation of the cocking lever to lift the speaker member and to lift the needle out of engagement with the sound track to thereby return the tone arm to the outer periphery of the record.

Further objects, features and advantages of the invention will become apparent upon a reading of the specification when taken in conjunction with the drawings in which like reference numerals refer to like elements in the several views.

DESCRIPTION OF THE PREFERRED EMBODIMENT

Figures 1, 2, 3, 4:
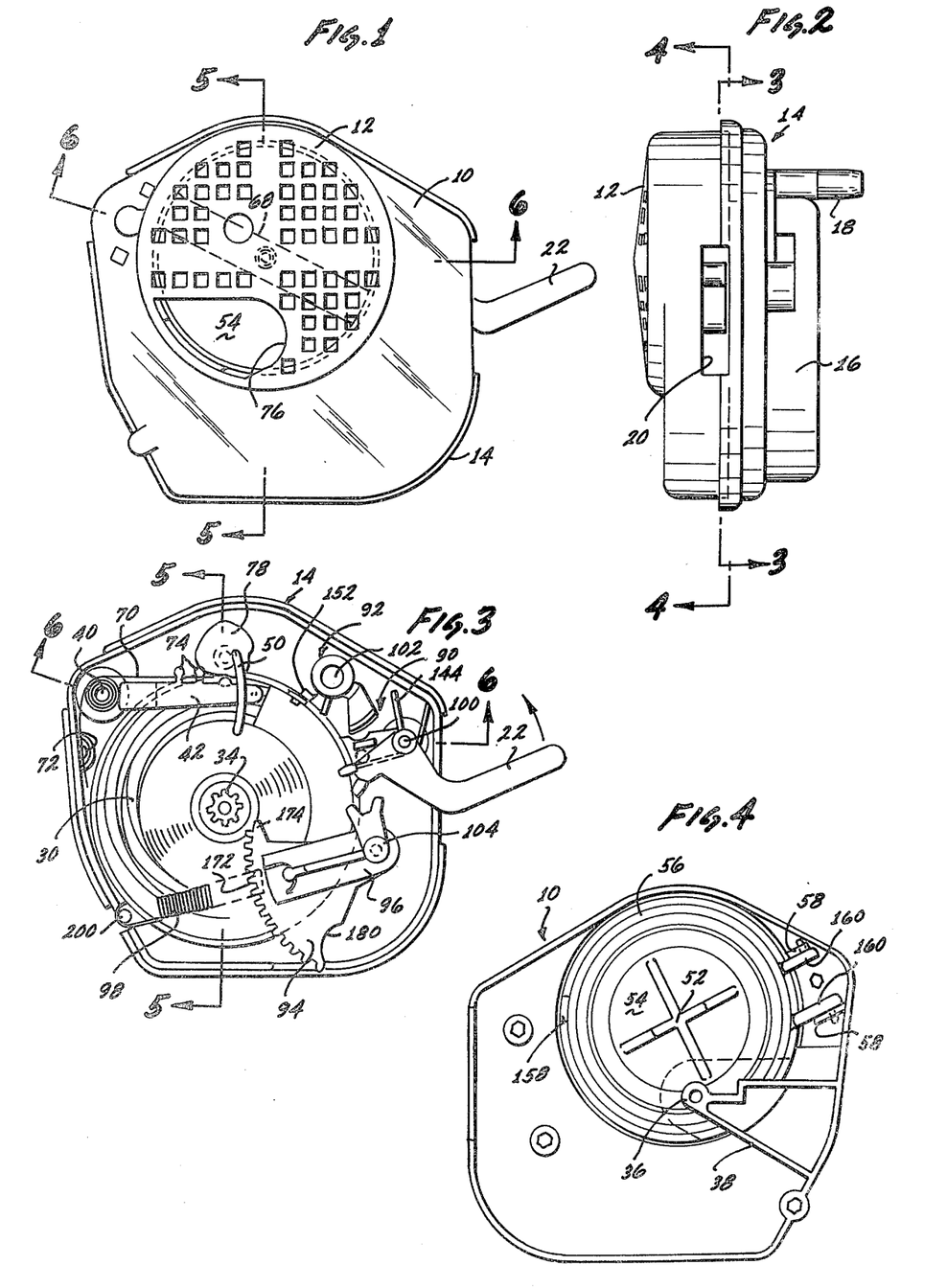
FIG. 1 is a plan view of the phonograph device according to the invention.
FIG. 2 is a side elevational view of the device of FIG. 1.
FIG. 3 is a plan view of the device of FIG. 1 with the top housing and speaker member removed.
FIG. 4 is a plan view showing the top housing and speaker assembly in its inverted position.

Referring now to the drawings and particularly to FIGS. 1 and 2 there is shown a voice unit in accordance with the invention, the voice unit having an upper housing, generally designated 10, having a raised speaker receiving portion 12, circular in cross section and having a plurality of apertures therein for passage of sound therethrough. A lower housing generally designated 14 is secured thereto for providing a compartment for receiving the components therein. The lower housing 14 has an enlarged circular flywheel receiving portion 16. Extending outwardly from the lower housing 14 is a track selector knob 18 rotatably extending through the housing 14 for selecting the track on the record disc in a manner which will be hereinafter discussed. Extending outwardly through a slot 20 formed in one side of the voice unit at the juncture of the two housings is a cocking lever 22 adapted to actuate the voice unit.

Figure 5:
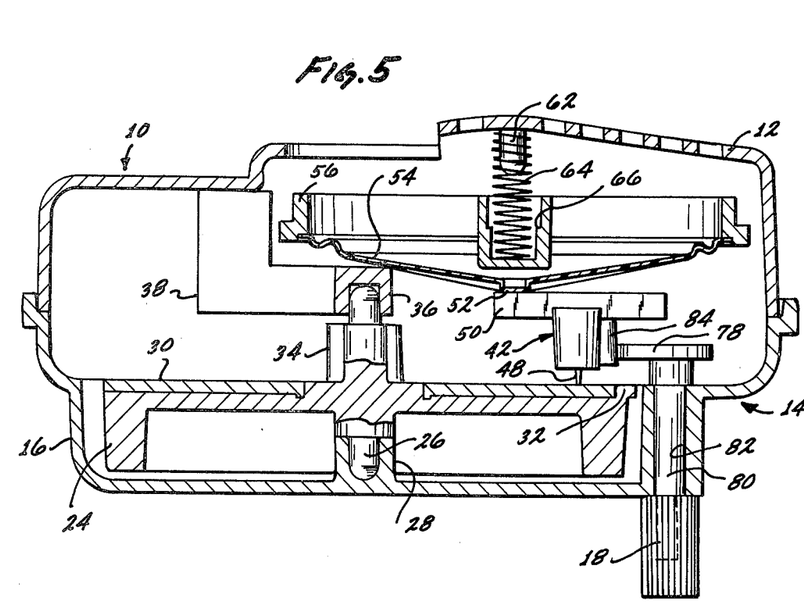
FIG. 5 is a cross-sectional view of the device taken along line 5—5 of FIGS. 1 and 3 with some components removed for ease of illustration.
Figure 6:
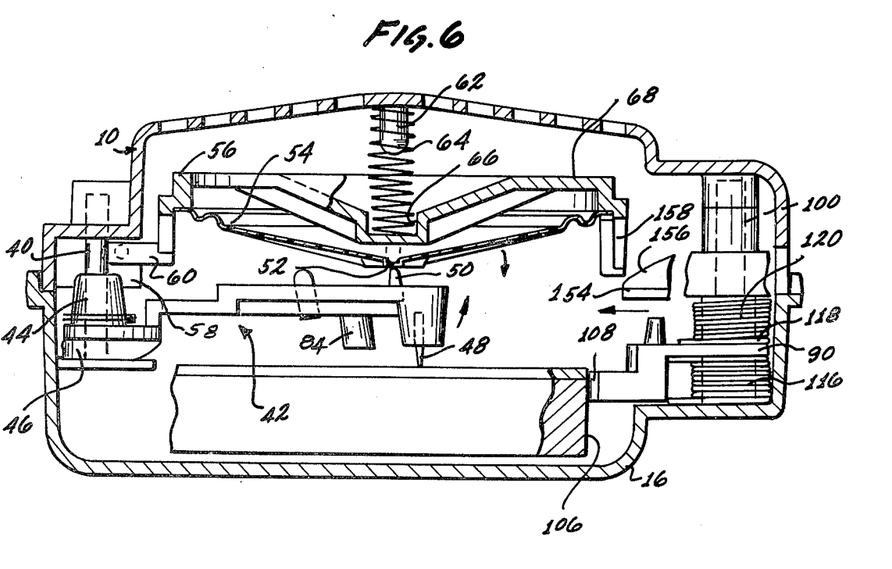
FIG. 6 is a cross-sectional view of the device taken along line 6—6 of FIGS. 1 and 3, partially broken away with certain components omitted for ease of illustration.

Referring now to FIGS. 3, 5 and 6, the components assembled within lower housing 14 will be discussed. Mounted within the flywheel receiving portion 16 is a flywheel 24 rotatably received within portion 16 by means of the shaft 26 fitting within a bearing 28 centrally disposed in portion 16 (see FIG. 5). Suitably secured on the upper surface of flywheel 24 is a record or disc 30 (see also FIG. 7) which is provided with a notch along the edge thereof for mating engagement with a projection 32 for positioning purposes. The shaft 26 of flywheel 24 extends on either side thereof with the upper portion of shaft 26 having a pinion gear 34 formed integral therewith, the other end of shaft 34 being suitably received within a bearing 36 formed at the outer free end of a bearing arm 38 (see FIG. 4) formed integrally within upper housing 10. The bearing arm 38 is generally L-shaped and is configured to provide clearance as well as support for a speaker member.

The flywheel 24 is configured to have the bulk of the mass at the circumference thereof to provide a controllable rotational inertia, the flywheel 24 being suitably formed of metal. As will hereinafter be discussed the record disc 30 is prerecorded to match the rundown speed of the flywheel 24 under control of a spring.

Pivotally mounted within lower housing 14 on a shaft 40 formed integral therewith is a tone arm generally designated 42, one end of the tone arm 42 having an enlarged portion 44 with a frusto-conical aperture 46 formed therein with the narrow portion of aperture 46 extending upwardly as viewed in FIG. 6. The outer free end of tone arm 42 carries a suitable downwardly depending needle 48 adapted to engage the sound tracks on the disc 30. The upper edge of tone arm 42 in proximity to needle 48 is provided with an arcuate transversely extending sound transmitting bar member 50 normally adapted to engage the apex 52 of a speaker member 54 for transmission of sound from the sound tracks on disc 30 through the needle 48 through the bar member 50 to vibrate the apex 52 of the speaker member 54. As illustrated in FIGS. 4 and 6, the speaker member 54 is suitably adhesively secured at the outer periphery thereof to a speaker frame 56 which is pivotally mounted to upper housing 10 by means of downwardly depending ears 58 pivotally receiving extensions 60 of speaker frame 56. The speaker member 54 is centrally positioned with respect to the speaker portion 12 of upper housing 10 which is provided with an inwardly extending projection 62 encircled by a coil spring 64, the other end of coil spring 64 abutting within a recess 66 formed in a transversely extending bar member 68 integral with speaker frame 56. The coil spring 64 normally urges against speaker frame 56 to thereby urge the free rotating apex portion 52 of speaker member 54 into engagement with the arcuate bar member 50 of tone arm 42. The tone arm 42 (see FIGS. 3 and 6) has a bias spring with a coiled portion encircling the enlarged portion 44 of tone arm 42, one free end of bias spring 70 being suitably retained by a tab 72 formed in the sidewall of the lower housing 14, the other end of bias spring 70 being retained by suitable spaced shoulder members 74 extending outwardly from the side of tone arm 42. Bias spring 70 is so constructed and so secured to tone arm 42 to normally bias tone arm 42 outwardly toward the periphery of disc 30 and upwardly toward speaker member 54 with pivotal movement upwardly being accommodated by the frusto-conical aperture 46 within the enlarged portion 44 of tone arm 42. As will hereinafter be discussed this upward lifting action of coil spring 70 enables the tone arm 42 to be lifted from the surface of disc 30 after the completion of playing of a sound track when the speaker frame 56 is pivoted about its axis to lift the free end thereof and permit needle 48 to disengage from the surface of disc 30 and return to the outer periphery under force of bias spring 70. To minimize the amount of lifting required, as shown in FIG. 6, the speaker frame 56 pivot is in proximity to the pivot 40 of tone arm 42. As previously discussed in connection with FIG. 5 the bearing arm 38 is configured to assist in limiting the downward movement of speaker frame 56, especially when the unit is being assembled. During assembly of the unit the speaker frame 56 with the speaker 54 secured thereto is pivotally mounted to ears 58 within upper housing 10 with coil spring 64 in place, and as can be seen in FIG. 4 which is the assembled condition of the speaker frame 56 within upper housing 10, the pivoting of speaker frame 56 away from the inside surface of upper housing 10 will be restricted by the bearing arm 38 abutting against the speaker 54. As shown in dotted lines in FIG. 4 and solid lines in FIG. 1 the speaker portion 12 of upper housing 10 is provided with an irregular somewhat oblate cutaway portion 76 designed to accomodate the pivoting of speaker frame 56 toward housing 10 without interference.

Referring to FIGS. 2, 3 and 5 the movement of tone arm 42 to the outer periphery of disc 30 is controlled by means of an eccentric rotatable cam 78, the cam 78 having a shaft portion 80 extending through an aperture 82 in lower housing 14, the free end of shaft 80 extending outwardly thereof and having affixed thereto the track selector knob 18. Shaft 80 rotates about an axis generally parallel to the pivot axis 40 of tone arm 42 with cam 78 being irregularly configured with a plurality of detents about the periphery thereof for engaging a tab 84 formed in the side of tone arm 42. By rotation of knob 18 the position of needle 48 with respect to the outer periphery of disc 30 can be preset.

Referring again to FIG. 3 the components which comprise the actuating mechanism include the cocking lever 22, a brake shoe member 90, a speaker lift member 92, a gear sector 94, a gear sector actuator 96 and a coil spring 98 which provides the source of energy for operation of the voice unit as will hereinafter be discussed. For purposes of assembling these components within lower housing 14, formed integrally within the surface are three outwardly extending pivot studs located in proximity to but outside the periphery of flywheel receiving portion 16 of lower housing 14. A first pivot stud 100 is positioned at a point adjacent slot 20 which is on an edge of housing 14 generally opposite the shaft 40 about which tone arm 42 pivots. A second pivot stud 102 is generally intermediate pivot stud 100 and rotatable cam 78 while the third pivot stud 104 is positioned roughly diametrically across from shaft 40.

Figures 7, 8, 9, 10, 11, 12, 13, 14:
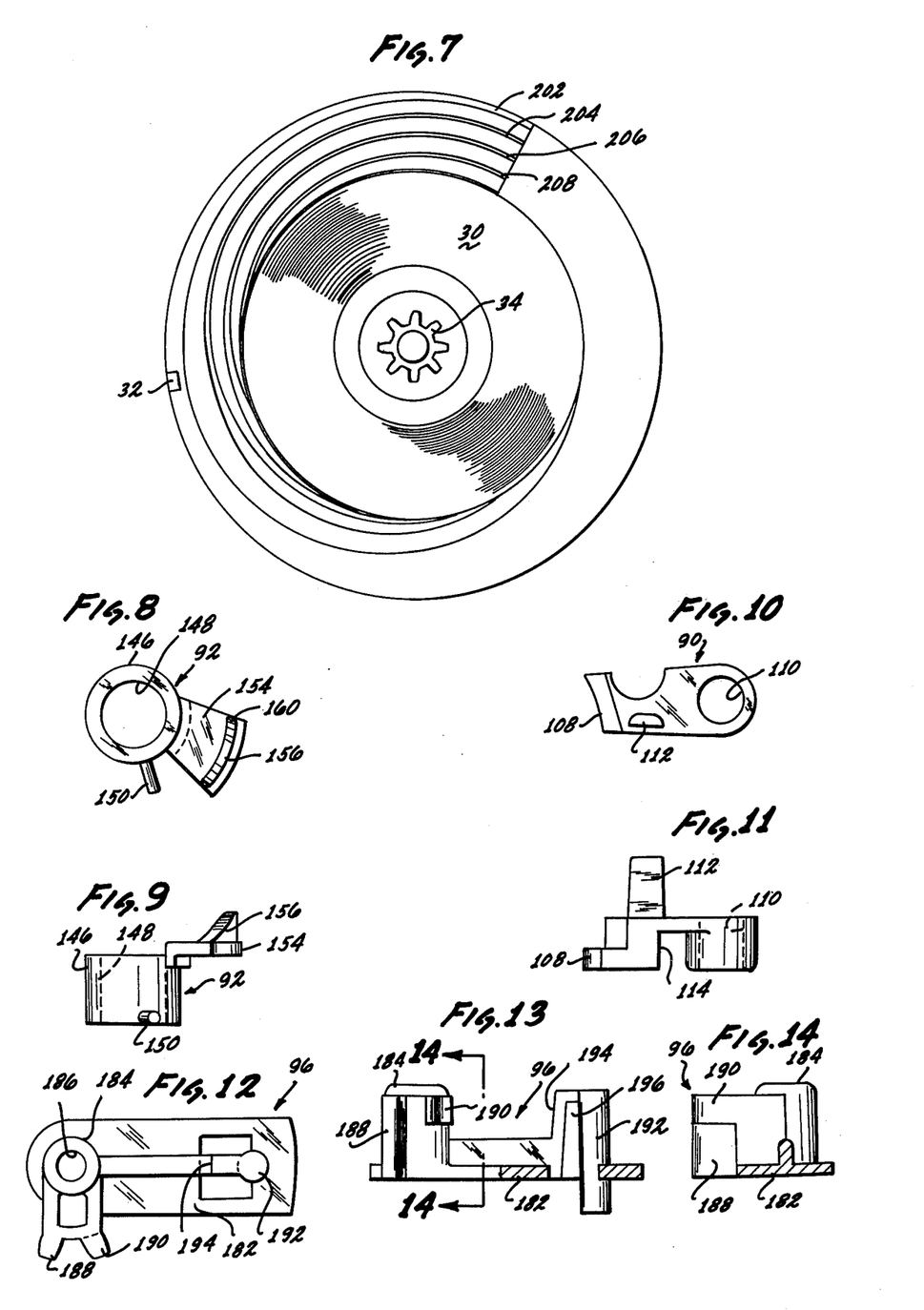
FIG. 7 is an enlarged plan view of the record member used in the device of FIG. 1.
FIG. 8 is a top plan view of the speaker lifting member.
FIG. 9 is a side view of the speaker lifting member of FIG. 8.
FIG. 10 is a plan view of the brake shoe member.
FIG. 11 is a side elevational view of the brake shoe member of FIG. 10.
FIG. 12 is a plan view of the gear sector actuator.
FIG. 13 is a side elevation partially cross sectioned, of the gear sector actuator of FIG. 12.
FIG. 14 is a cross-sectional view of the gear sector actuator taken along line 14—14 of FIG. 13.
Figure 19:
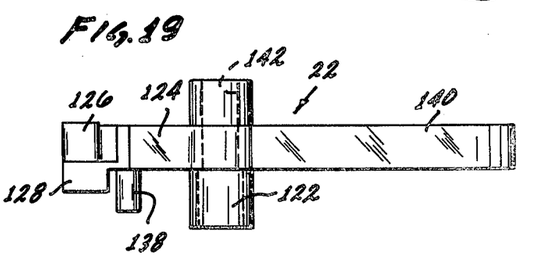
FIG. 19 is a front elevation of the cocking lever of FIG. 17.
Figures 20, 21:
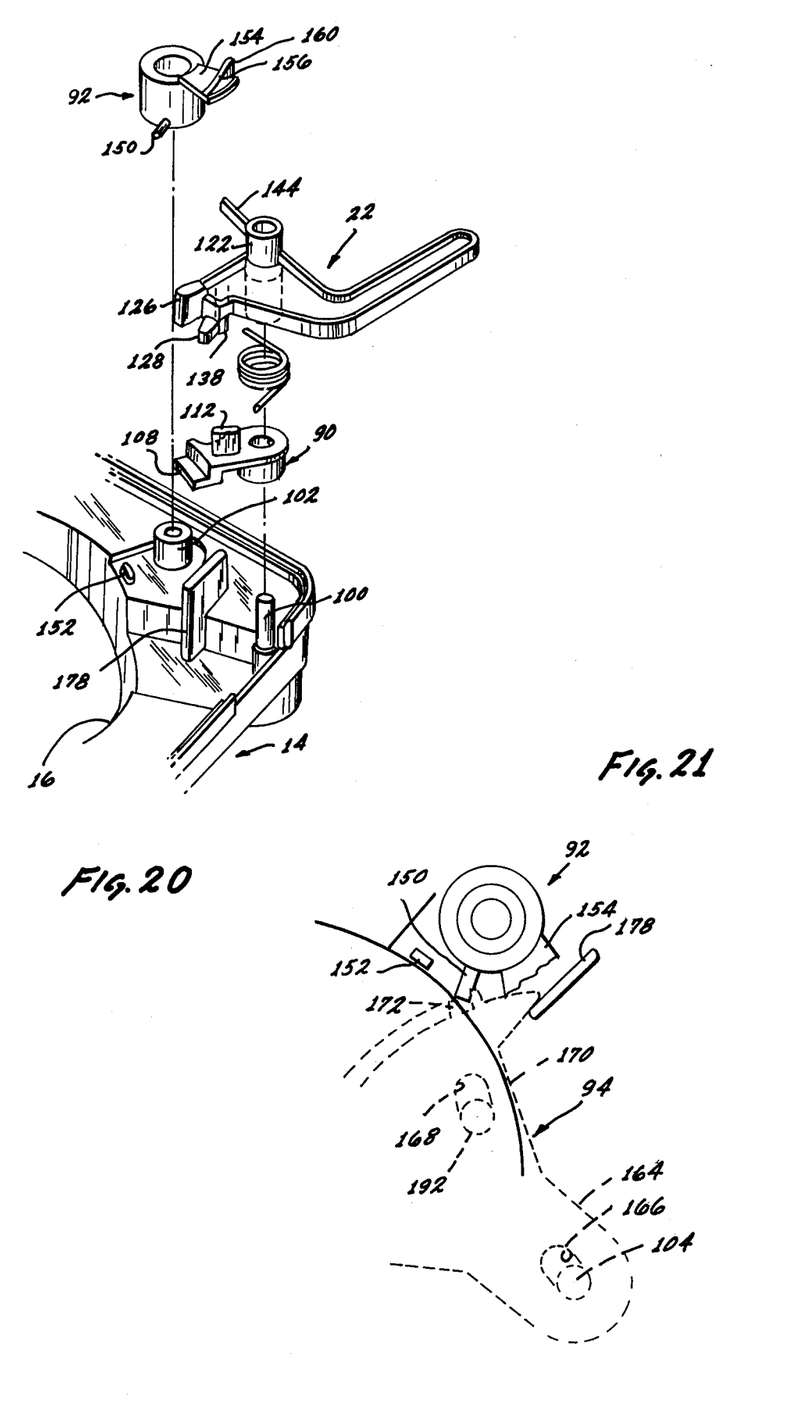
FIG. 20 is an exploded perspective view of one corner of the device of FIG. 1 showing the cocking lever, brake shoe member and speaker lifting member.
FIG. 21 is a diagramatic plan view illustrating the positional relation of the gear sector when fully actuated just prior to engagement with the flywheel.

Referring to FIGS. 6 and 20, particularly and also to FIGS. 3, 10, 11 and 17–19 by components assembled on pivot stud 100 will be discussed, these including the brake shoe member 90 and the cocking lever 22. As shown in FIG. 6 the flywheel 24 has an outer drum surface 106 with brake shoe member 90 fitted on stud 100 with the curved edge acting as a brake shoe 108 in abutting relation against drum surface 106 of flywheel 24. Referring also to FIGS. 10 and 11 the brake shoe member 90 is generally bar-shaped in plan view with the brake shoe 108 formed in one end thereof, the other end thereof having an aperture 110 of a diameter sufficient to be pivotally engaged on stud 100. Extending upwardly from the surface of brake shoe member 90 is a projection 112 adapted to coact with a portion of the cocking lever as will be described below. As shown in FIG. 11 intermediate aperture 110 and brake shoe 108, the brake shoe member 90 is provided with a recessed portion 114 and as shown in FIG. 6, a torsion spring 116 encircles the brake shoe member 90 around the periphery of aperture 110 with one end thereof abutting against the adjacent surface of recess 114 and the other end thereof abutting against the inner surface of lower housing 14 to bias the brake shoe 108 into engagement with the drum surface 106. A washer member 118 is then positioned on stud 100 against the upper surface of brake shoe member 90. The cocking lever 22 is then assembled on stud 100 with a second torsion spring 120 encircling the lower portion of shaft 122 thereof, torsion spring 120 having the free ends thereof suitably secured to the cocking lever 22 and to the inner surface of housing 14 to bias the cocking lever 22 to the position shown in FIG. 3. As shown in FIG. 3 the cocking lever 22 is normally biased clockwise about stud 100 while brake shoe member 90 is normally biased counterclockwise.

Figure 17:
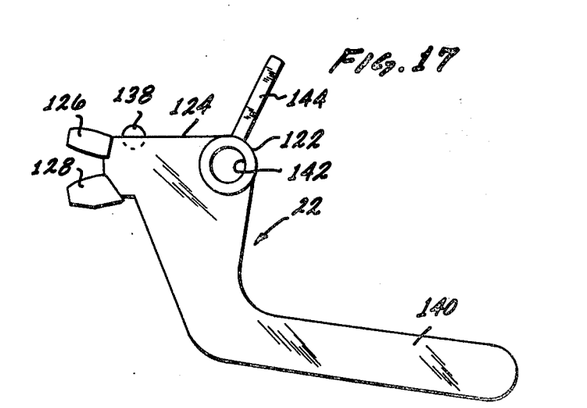
FIG. 17 is a plan view of the cocking lever.
Figure 18:
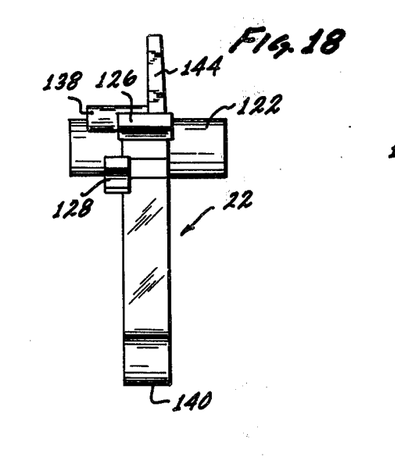
FIG. 18 is a side elevation of the cocking lever of FIG. 17.

Referring to FIGS. 17-19 the cocking lever 22 is generally Z-shaped in plan view and has a first arm 124 extending outwardly from shaft 122 thereof, the arm 124 having formed in the free end thereof a first outwardly extending tooth member 126 which is broad-faced, and a second tooth member 128 which is shorter in height than first tooth member 126, the two teeth forming a spaced gear pair extending radially outwardly from a common point intermediate the gear pair and shaft 122. Downwardly depending from one edge of arm 124 is a stop projection 138 adapted to engage the projection 112 of brake shoe member 90. The cocking lever 22 has an intermediate portion extending generally transverse to the first arm 124 with a cocking arm 140 extending outwardly therefrom in a direction generally opposite to that of first arm 124, the cocking arm 140 extending out of the housing 14 as depicted in FIGS. 1 and 3. The shaft 122 is provided with a centrally disposed aperture 142 throughwhich pivot stud 100 extends in the assembled condition. Integrally formed in one edge of the cocking lever 22 is a third arm extending out from shaft 122, this being the speaker lift member actuating arm 144 which extends outwardly in a direction generally transverse to first arm 124.

Referring now to FIGS. 3, 6, 8 and 9 the speaker lift member 92 will be discussed. The speaker lift member 92 has a main cylindrical body portion 146 with a centrally extending aperture 148 through which pivot stud 102 extends for pivotally receiving speaker lift member 92. Radially outwardly extending from the main body portion 146 is a stop pin 150 adjacent the lower edge thereof, the stop pin 150 being adapted to abut against an integrally formed stop member 152 formed in the interior surface of housing 14 in proximity to stud 102 to thereby limit the maximum amount of pivoting of speaker lift member 92. Outwardly extending from the opposite end of main body portion 146 is a flange 154 having a perpendicular cam 156 formed in the upper surface thereof, the cam 156 being adapted to engage a downwardly depending projection 158 (see FIG. 6) formed integrally within the outer edge of speaker frame 56 at a point directly opposite and in line with the pivot member 60 thereof. The cam 156 has an edge 160 thereof generally perpendicular to flange 154 and in the assembled condition shown in FIG. 3, as can be seen, the speaker lift member actuating arm 144 of cocking lever 22 when pivoted in a counterclockwise direction, will engage the edge 160 thereby pivoting speaker lift member 92 until cam 156 thereof engages the speaker frame projection 158 to thereby lift the projection 158 to pivot speaker frame 156 upwardly as viewed in FIG. 6. Furthermore, as shown in FIG. 3, the stop projection 138 of cocking lever 22 abuts against projection 112 of brake shoe member 90 and the interrelationship of these two parts is such that with cocking lever 22 in the position shown in FIG. 3 the clockwise bias of cocking lever 22 urges stop projection 138 against projection 112 to thereby rotate brake shoe member 90 slightly clockwise so that brake shoe 108 thereof is out of engagement with the drum surface 106 of flywheel 24. The reason for this will be discussed hereinafter with respect to the operation of the voice unit.

Figures 15, 16:
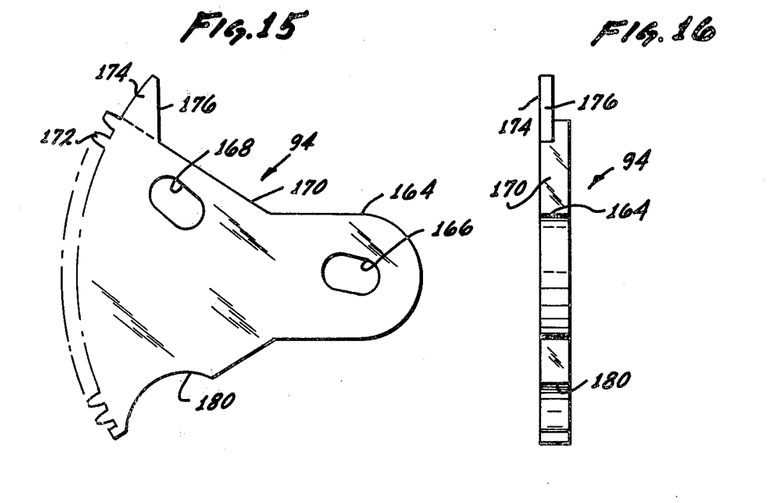
FIG. 15 is a plan view of the gear sector.
FIG. 16 is an end elevational view of the gear sector of FIG. 15.

The details pertaining to the means for powering the voice unit will now be discussed with reference to FIGS. 3, 12-14, 15 and 16. As shown in FIGS. 15 and 16 the gear sector 94 is generally fan-shaped with an enlarged apex portion 164 having an elongate slot 166 therein adapted for mounting over stud 104 within lower housing 14. A second elongate slot 168 is formed adjacent one edge of gear section 94 in a line generally parallel to the edge, this edge being the leading edge of gear sector 94, that is, the edge in the direction of pivoting when gear sector 94 is actuated. Along the leading edge 170 adjacent the gear teeth 172 is a peripherally extending projection 174 having an inwardly inclined edge 176 adapted to engage a projection 178 (see FIG. 20) to urge gear sector 94 outwardly by permitting elongate slot 166 to slide with reference to stud 104. With stud 104 positioned within elongate slot 166 against the outer edge thereof the radius of the gear teeth 172 is such as to permit engagement with pinion 34 flywheel 24. When stud 104 is at the other end of slot 166 the teeth 172 are correspondingly out of engagement with pinion 34 as will hereinafter be discussed. The trailing edge of gear sector 94 is provided with a cutaway portion 180 to permit clearance with respect to the lower housing 14.

The gear sector actuator 96 (see FIGS. 3 and 12-14) has a generally bar-shaped portion 182 with a generally cup-shaped portion 184 formed in one end thereof with an aperture 186 formed therein for receiving the upper edge of shaft 104. Extending generally transverse to the longitudinal axis of bar-shaped portion 182 and outwardly from the surface of cup-shaped portion 186 is an integral gear pair having a first long broad surfaced gear tooth 188 and a second shorter gear tooth 190, the gear teeth 188 and 190 being adapted to coact with the gear teeth 126 and 128 of cocking lever 22. At the other end of bar-shaped portion 182 the gear sector actuator 96 is provided with a shaft 192 having a portion thereof depending below the surface of bar-shaped portion 182 for engagement within elongate slot 168 of gear sector 94. The portion of shaft 192 above bar-shaped portion 182 has an integral web portion 194 to form a recess 196 therein for receiving one end of coil spring 98 (see FIG. 3).

In the assembled condition gear sector 94 has the elongate slot 166 thereof positioned over stud 104 formed within housing 14. The gear sector actuator 96 has the recess 186 of cup-shaped portion 184 positioned on stud 104 with the downwardly extending portion of shaft 192 fitted within elongate slot 168 of gear sector 94. The purpose of the cup-shaped portion 184 is to control the spacing between gear sector actuator 96 and gear sector 94 so that a slight spacing between the parts when in sliding relation permits the gear sector 94 to move under the force of inertia with respect to the elongate slots 166 and 168. In the assembled condition shown in FIG. 3 the gear teeth 188 and 190 of gear sector actuator 96 extend toward the corresponding gear teeth pair of cocking lever 22 with the radiuses of rotation thereof permitting coaction during operation.

The gear sector actuator 96 has one end of coil spring 98 fitting within recess 194 about shaft 192 with the other end of coil spring 98 being suitably secured to an integrally formed boss 200 formed in the surface of lower housing 14 with the coil spring 98 being under tension at this point and urging gear sector actuator 96 along with gear sector in a line between stud 104 and boss 200, this line being generally tangential to a radius of the record or disc 30 and spaced along this radius at a point intermediate the axis of rotation of disc 30 and the outer periphery thereof.

As previously mentioned the record 30 is prerecorded to match the rundown speed of the flywheel 24 and with a known tension force of coil spring 98 and a known moment of inertia of flywheel 24 at the rundown speed can be reasonably calculated with a high degree of accuracy to permit good fidelity of the sound recording during playback. Furthermore, by maintaining close tolerances the unit could be mass produced and comprises a minimum number of parts without the necessity for a governor to regulate speed.

Prior to discussion of the operation of the voice unit, referring to FIG. 7, the details pertaining to the layout of the grooves on the record 30 will be discussed. As shown in FIG. 7 the record 30 is provided with four interleaved sound tracks 202, 204, 206, and 208, the four sound tracks generally terminating on a common radius of disc 30. The sound tracks are of the type known as the "hill and dale" tracks in which the amplitude of the groove varies in a direction generally perpendicular to the surface of disc 30 thereby resulting in up and down movement of needle 48 engaging one of the sound tracks during pivoting of tone arm 42 with record 30 rotating. This up and down movement (see FIG. 6) is transmitted through bar member 50 to the apex 52 of speaker member 54 generating sound which passes out through the open grillwork immediately above speaker member 54.

The operation of the voice unit will be discussed with reference to FIGS. 3, 5 and 6 with FIG. 3 illustrating the components in normal position prior to actuation. The cam 78 is pre-positioned by rotation of track selector knob 18 until a particular detent within the edge of cam 78 abuts against a downwardly extending projection 84 in tone arm 42 adjacent needle 48. This pre-positioning of cam 78 establishes the needle position with respect to one of the sound tracks 202-208 and effectively limits the counterclockwise pivotal movement of tone arm 42 as viewed in FIG. 3. As previously discussed with cocking lever 22 normally biased clockwise as shown the brake shoe member 90 is likewise urged clockwise so that the brake shoe 108 thereof is slightly out of engagement with the adjacent drum surface 106 of flywheel 24. Gear sector 94 as previously discussed slides with respect to gear sector actuator 96 in a radial direction with respect to stud 104 due to the elongated slots 166 and 168 within gear sector actuator 96 respectively coacting with shaft 192 of gear sector actuator 96 and stud 104. In the initial condition the gear sector 94 is withdrawn, that is, with respective engaging shaft 192 and stud 104 being at the outer limits of elongate slots 166 and 168 respectively, thus effectively shortening the radius of rotation of the gear teeth 172 of gear sector 94. As cocking lever 22 is rotated in the direction of the arrow shown in FIG. 3, that is, in a counterclockwise direction, the broad surface of first gear tooth 126 thereof rotates to engage the broad surface of gear tooth 188 of gear sector actuator 96 to thereby pivot gear sector 94 in a clockwise direction about stud 104 with the gear teeth thereof out of engagement with the pinion 34 of flywheel 24. Upon the initial movement of cocking lever 22 the stop projection 138 thereof moves out of engagement with the projection 112 of brake shoe member 90 thereby urging brake shoe 108 thereof against the drum surface 106 of flywheel 24 to thereby maintain flywheel 24 in a stationary position during actuation of the unit. As the cocking lever 22 pivots an additional angle speaker lift member actuator arm 144 engages edge 160 of the cam 156 of speaker lift member 92 to start rotation of this member in a clockwise direction with cam 156 engaging projection 158 (see FIG. 6) of speaker frame 56 to thereby pivot speaker frame 56 along with speaker member 54 in a counterclockwise direction. This action lifts the apex 52 and since tone arm 42 is biased upwardly as well as outwardly by means of torsion or bias spring 70, the needle 48 will lift in the direction of the arrow adjacent thereto out of engagement with the sound tracks of disc 30. Simultaneously bar member 50 will slide with respect to apex 52 outwardly toward the periphery of disc 30 until the projection 84 of tone arm 42 engages the cam 78 to pre-position needle 48 with respect to one of the sound tracks for further playback. As the cocking lever 22 is pivoted further the engagement of the teeth thereof with the teeth of gear sector actuator 96 pivots gear sector 94 in a clockwise direction until the inwardly inclined edge 176 thereof engages the projection 178 (see FIG. 21) thereby sliding gear sector 94 radially outwardly with respect to gear sector actuator 96 until the shaft 192 and stud 104 are at the other ends of elongate slots 168 and 166 respectively. In this position the radius of gear teeth 172 of gear sector 94 is in alignment to mesh with the gear teeth of pinion 34 of flywheel 24. In the fully clockwise position of gear sector 94 the coil spring 98 is under maximum tension and is urging the gear sector 94 and the gear sector actuator 96 back to its stable position, the stable position being that shown in FIG. 3. The energy stored in spring 98 is now ready to impart a predetermined rotational force to the flywheel 24 through pinion gear 34. As the cocking lever 22 is then released, the force of spring 64 urging against speaker frame 56 urges projection 158 against cam 156 to thereby rotate speaker lift member 92 counterclockwise. As cocking lever 22 returns under force of torsion spring 120 in a clockwise direction the brake shoe member 90, at this point is still in engagement with the drum surface 106 and the gear teeth 172 of gear sector 94 are in engagement with the pinion 34 but movement of flywheel 30 is still restricted due to the engagement of the brake shoe member 90. As the cocking lever 22 rotates clockwise an additional increment stop projection 138 thereof engages projection 112 of brake shoe member 90. Just prior to, or at about the same time, the needle 48 has reached its downward descent due to the pressure exerted on bar member 50 by apex 52 as speaker frame 56 pivots back to its normal position, with the needle 48 engaging the appropriate sound track on disc 30.

At the point where the stop projection 138 of cocking lever 22 commences engagement with projection 112 of brake shoe member 90 the gear sector 94 is in meshing engagement with pinion 34 with gear sector 94 being urged in a counterclockwise direction under force of coil spring 98 which at this point is in maximum tension, but the flywheel 24 is unable to move due to the coaction of brake shoe member 90 with the adjacent drum surface 106 of flywheel 24. As cocking lever 22 rotates clockwise an additional increment to its final "at rest" position, stop projection 138 thereof urges against projection 112 to thereby rotate brake shoe member 90 in a clockwise direction until the brake shoe 108 thereof is out of engagement with the drum surface 106 to thereby permit flywheel 24 to rotate in a clockwise direction as viewed in FIG. 3. Effectively, upon release of brake shoe 108, the energy stored in spring 98 is suddenly imparted to the flywheel 24 to provide a predetermined rotational force thereto.

The brake shoe member 90 and its interrelationship with cocking lever 22 performs two functions. The first function of brake shoe member 90 is to insure that a constant rotational force is imparted to the flywheel 24 by maintaining flywheel 24 stationary regardless of the speed of release of cocking lever 22, since the gear sector 94 in engagement with pinion 34 will not rotate flywheel 24 until the last increment of pivoting is achieved by cocking lever 22. This last increment of travel is that increment required for stop projection 138 of cocking lever 22 to urge against projection 112 of brake shoe member 90 thereby releasing brake shoe 108 from engagement with the drum surface 106 of flywheel 24. The second function served by the brake shoe member 90 occurs when the unit has once been actuated and a subsequent actuation is effected prior to a complete stop of the rotating flywheel 24. In this instance, with flywheel 24 still rotating, as soon as cocking lever 22 is actuated by movement in the counterclockwise direction, during the first increment of movement thereof stop projection 138 is moved out of engagement with projection 112 of brake shoe member 90 thereby permitting brake shoe 108 thereof to engage drum surface 106 thereby stopping flywheel 24.

By the utilization of the cocking mechanism in conjunction with the brake shoe member as hereinabove described good fidelity in reproduction of the recordings on the sound tracks 202–208 is possible without a governor by pre-recording the sound tracks to the rundown speed of the flywheel 24. The requirements for effecting good reproduction in a mass-produced voice unit of this type are that the moment of inertia of the flywheel must be known and must be controlled and that the initial force applied to rotate the mass must be constant and must be known. By constructing the flywheel 24 with the greater part of the mass adjacent the circumference thereof, the moment of inertia can be readily controlled without tight tolerances and furthermore, by insuring that the flywheel 24 is at a dead stop prior to imparting the rotational force any variances due to a moving object are eliminated. Additionally, the slight increment of travel of cocking lever 22 to its "at rest" position prior to release of brake shoe member 90 guards against the posibility of a child cocking the lever 22 and then restraining the lever 22 against its bias for a major part of its return which, without brake shoe member 90, would introduce another variable into the system. Similarly the provision of gear sector 94 being in a retracted position until cocking lever 22 is fully actuated is accomplished by requiring that gear sector 94 must be fully rotated against the force of coil spring 98 and the gear teeth 172 thereof will not engage pinion 34 until the inclined edge 176 of gear sector 94 contacts the projection 178 within lower housing 14 to urge the teeth 172 into engagement with pinion 34. Consequently when the child is merely "pumping" the cocking lever 22, without moving it to its fully actuated position there will be no meshing of gear teeth.

As the record member of disc 30 rotates, the needle 48 travels up and down by virtue of the sound track grooves while simultaneously tracking within the so-selected sound track with bar member 50 and its arcuate configuration in constant engagement with apex 52 of speaker 54 thereby generating for reproducing the sound until the end of the respective sound track at which time the needle 48 will be in proximity to the central portion of disc 30. As the gear sector 94 continues in its travel in a counterclockwise direction as viewed in FIG. 3, when the "stable" position under force of coil spring 98 is reached, the inertia or momentum of gear sector 94 along with the spacing between gear sector actuator 96 and gear sector 94 results in an additional increment of movement of gear sector 94 until it is retracted, that is, in a position with the radius of the gear teeth thereof unable to coact with the gear teeth of pinion 34. Essentially, there is a slight override of movement of gear sector 94 which is basically due to the offset nature of the elongate slot 168, wherein the moment of inertia during the movement of gear sector 94 is along a circumference through a common radius with a circumference of gear teeth 172, until slot 168 is transverse to and offset from that circumference to redirect the moment of inertia inwardly toward the pivot point defined by stud 104. The phonograph device or voice unit is then in its normal condition and ready for a subsequent operation thereof.

As a result of construction hereinabove described, the voice unit is compact and efficient, requires no governing means of the disc 30, is powered by a single coil spring 98 and requires very little energy to actuate the unit by movement of the cocking lever 22 through a relatively short angle. While there has been shown and described a preferred embodiment it is to be understood that various other adaptations and modifications may be made within the spirit and scope of the invention.

What is claimed is:

1. In a phonograph device including a needle for tracking a sound track, a speaker cone and a tone arm having said needle depending therefrom, said tone arm transmitting vibrations from said needle to said speaker cone, the improvement which comprises:

a flywheel rotatably mounted within said device;

actuating means for suddenly imparting a predetermined rotational force to said flywheel, said flywheel running down at a predetermined rundown speed subsequent to cessation of said force;

a recorded member mounted for movement in response to rotation of said flywheel and having at least one sound track engageable by said needle, said sound track being pre-recorded to match the rundown speed of said flywheel; and means coupled to said actuating means for engaging said needle with said sound track upon the imparting of said rotational force whereby to reproduce said sound track in response to rotation of said flywheel.

2. The combination according to claim 1 wherein said recorded member is a record disc mounted on said flywheel.

3. The combination according to claim 2 wherein said flywheel has a shaft portion with a pinion and said actuating means includes a sector gear for selectively engaging said pinion.

4. The combination according to claim 3 wherein said sector gear is pivotally mounted within said device and said actuating means further includes a spring operatively coupled to said sector gear and a lever for pivoting said sector gear against the force of said spring.

5. The combination according to claim 4 wherein said sector gear has an elongate aperture engaging a pivot stud for enabling said sector gear to move toward and away from said pinion, and sector gear actuator means are slidably coupled to said sector gear for concurrent pivoting therewith for enabling the gear teeth of said sector gear to be positioned out of engagement with said pinion gear during pivoting of said sector gear against the force of said spring, said device being provided with means for moving said sector gear with respect to said pivot shaft within said elongate aperture to enable said sector gear to engage said pinion when fully pivoted against the force of said spring.

6. The combination according to claim 5 wherein said device further includes a brake shoe spring-biased into contact with said flywheel to maintain said flywheel stationery during cocking of said lever, said lever having means coacting with said brake shoe to urge said brake shoe out of engagement with said flywheel upon release of said lever to permit rotation of said flywheel.

7. In a phonograph device the combination comprising:
   a housing;
   a flywheel rotatably mounted within said housing and having a predetermined rundown speed;
   a recorded member mounted for movement in response to rotation of said flywheel and having at least one sound track pre-recorded to match the rundown speed of said flywheel;
   sound reproducing means selectively engaging said recorded member for reproducing said sound track;
   a lever pivotally mounted within said housing;
   a spring within said housing;
   actuating means coupled to said spring and responsive to the pivoting of said lever for storing energy in said spring;
   means within said housing coacting with said actuating means for enabling said actuating means to engage said flywheel upon complete pivoting of said lever, said actuating means being responsive to the release of said lever for utilizing the energy in said spring to impart suddenly a predetermined rotational force to said flywheel, said flywheel running down at a predetermined rundown speed subsequent to cessation of said force; and
   means coupled to said actuating means for operatively coupling said sound reproducing means with said recorded member upon the imparting of said rotational force whereby to reproduce said sound track in response to rotation of said flywheel.

8. The combination according to claim 7 wherein said recorded member is a record disc mounted on said flywheel.

9. The combination according to claim 8 wherein said flywheel has a shaft with a pinion and said other means include a sector gear actuator and a sector gear, said sector gear actuator being pivotally mounted within said housing and being coupled to said spring, said sector gear being coupled to said sector gear actuator for concurrent pivotal movement therewith and for slidable movement with respect thereto in the direction of said pinion.

10. The combination according to claim 9 wherein said housing includes means coacting with said sector gear to slide said sector gear with respect to said sector gear actuator to permit engagement of said sector gear with said pinion when said lever is fully pivoted.

11. The combination according to claim 10 further including brake means normally biased into contacting said flywheel and said lever includes means coacting with said brake means to release said brake means from engagement with said flywheel with said lever fully released.

12. The combination according to claim 11 wherein said brake means is a brake shoe member pivotally mounted on a shaft and said lever is pivotally mounted on the same shaft, said brake shoe member having a brake shoe at the free end thereof and a spring normally biasing said shoe in a direction to make contact with the flywheel, said brake shoe member having a projection thereon coacting with a projection on said lever, said lever having a spring member for biasing in a direction opposite to the bias of said brake shoe member, said projections coacting generally only with said lever in its released position for pivoting said brake shoe out of contact with said flywheel.

13. The combination according to claim 12 wherein said sound reproducing means includes a speaker member pivotally mounted within said housing and spring means normally biasing said speaker member toward said record disc.

14. The combination according to claim 13 wherein said sound reproducing means includes a tone arm pivotally mounted within said housing and having a needle depending from the free end thereof for engaging said sound track, said tone arm coacting with said speaker member whereby to transmit vibrations from said sound track to said speaker member.

15. The combination according to claim 14 wherein said phonograph device further includes means engageable by said lever for lifting said speaker member and permitting said tone arm to return to the periphery of said record disc.

16. The combination according to claim 15 wherein said lever includes an arm and said means for lifting said speaker member includes a pivotal member having a cam surface and being pivotable by said arm, said cam surface being configured and positioned to engage a projection on said speaker member to pivot said speaker member away from the surface of said record disc.

* * * * *